(12) United States Patent
Xue et al.

(10) Patent No.: US 9,805,744 B1
(45) Date of Patent: Oct. 31, 2017

(54) DUAL WRITER DESIGN IN INTERLACED MAGNETIC RECORDING

(71) Applicant: Seagate Technology LLC, Cupertino, CA (US)

(72) Inventors: Jianhua Xue, Maple Grove, MN (US); Jian Zhong, Bloomington, MN (US); Lei Lu, Bloomington, MN (US); Yan Dong, Chanhassen, MN (US); Kirill Rivkin, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/088,752

(22) Filed: Apr. 1, 2016

(51) Int. Cl.
*G11B 5/31* (2006.01)
*G11B 5/127* (2006.01)

(52) U.S. Cl.
CPC .......... *G11B 5/3116* (2013.01); *G11B 5/1278* (2013.01); *G11B 5/315* (2013.01)

(58) Field of Classification Search
CPC ..... G11B 5/3116; G11B 5/1278; G11B 5/315; G11B 5/3146; G11B 5/4886; G11B 5/012
See application file for complete search history.

(56) References Cited

U.S. PATENT DOCUMENTS

| | | | |
|---|---|---|---|
| 4,030,130 A | 6/1977 | Smith | |
| 4,152,736 A | 5/1979 | Jansen et al. | |
| 4,298,897 A | 11/1981 | Arter et al. | |
| 4,535,372 A | 8/1985 | Yeakley | |
| 4,622,601 A | 11/1986 | Isozaki et al. | |
| 4,646,168 A | 2/1987 | Sonobe et al. | |
| 4,771,346 A | 9/1988 | Shoji et al. | |
| 4,803,571 A | 2/1989 | Fujioka et al. | |
| 4,853,799 A | 8/1989 | Aikawa | |
| 4,864,717 A * | 9/1989 | Baus, Jr. | G11B 5/10 29/603.05 |
| 4,933,795 A * | 6/1990 | Nigam | G11B 19/00 360/121 |

(Continued)

FOREIGN PATENT DOCUMENTS

| | | |
|---|---|---|
| EP | 0484774 A2 | 5/1992 |
| EP | 1564736 A2 | 8/2005 |

(Continued)

*Primary Examiner* — Brian Miller
(74) *Attorney, Agent, or Firm* — Holzer Patel Drennan

(57) ABSTRACT

The disclosed technology includes a storage device including an interlaced magnetic recording (IMR) system, and a transducer head, including two writers, each writer including a write pole, wherein a width of a first write pole in a cross-track direction is substantially greater than a width of a second write pole in the cross-track direction, and wherein a down-track width of a front shield gap of the first write pole is substantially similar to down-track width of a front shield gap of the second write pole. In another implementation, the storage device includes an IMR system, and a transducer head, including two writers, each writer including a write pole, wherein a width of the first write pole in a cross-track direction is substantially greater than a width of a second write pole in a cross-track direction, and wherein a cross-track width of a side shield gap of the first write pole is substantially similar to a cross-track width of a side shield gap of the second write pole.

19 Claims, 6 Drawing Sheets

(56) References Cited

U.S. PATENT DOCUMENTS

| | | | | |
|---|---|---|---|---|
| 4,967,301 A * | | 10/1990 | Lopez | G11B 5/112 360/128 |
| 5,010,430 A | | 4/1991 | Yamada et al. | |
| 5,285,341 A * | | 2/1994 | Suzuki | G11B 5/3103 360/121 |
| 5,402,270 A | | 3/1995 | McDonnell et al. | |
| 5,760,993 A | | 6/1998 | Purkett | |
| 5,892,634 A | | 4/1999 | Ito et al. | |
| 5,978,168 A | | 11/1999 | Mathews et al. | |
| 6,052,797 A | | 4/2000 | Ofek et al. | |
| 6,104,562 A | | 8/2000 | Ottesen et al. | |
| 6,185,063 B1 | | 2/2001 | Cameron | |
| 6,710,960 B1 | | 3/2004 | Yorimitsu | |
| 6,768,605 B2 | | 7/2004 | Yamamoto | |
| 7,130,152 B1 | | 10/2006 | Raymond et al. | |
| 7,259,927 B2 | | 8/2007 | Harris | |
| 7,393,066 B2 | | 7/2008 | Dugas et al. | |
| 7,440,222 B2 | | 10/2008 | Nakamura et al. | |
| 7,508,619 B2 | | 3/2009 | Okamoto et al. | |
| 7,573,682 B2 | | 8/2009 | Pust et al. | |
| 7,872,829 B2 | | 1/2011 | Sakai | |
| 7,872,835 B2 * | | 1/2011 | Guan | G11B 5/3116 360/319 |
| 7,907,360 B2 | | 3/2011 | Mak et al. | |
| 7,957,093 B2 | | 6/2011 | Brand | |
| 7,965,465 B2 | | 6/2011 | Sanvido et al. | |
| 7,990,653 B2 * | | 8/2011 | Mochizuki | G11B 5/11 360/125.09 |
| 8,023,215 B1 | | 9/2011 | Ghaly et al. | |
| 8,139,318 B2 | | 3/2012 | Biskeborn | |
| 8,310,777 B2 | | 11/2012 | Biskeborn et al. | |
| 8,310,782 B2 | | 11/2012 | Song et al. | |
| 8,400,731 B1 * | | 3/2013 | Li | G11B 5/3116 360/119.04 |
| 8,531,792 B1 | | 9/2013 | Burd et al. | |
| 8,531,793 B2 | | 9/2013 | Bandic et al. | |
| 8,537,481 B1 | | 9/2013 | Bandic | |
| 8,599,510 B1 | | 12/2013 | Fallone | |
| 8,665,548 B2 * | | 3/2014 | Hirata | G11B 5/012 360/75 |
| 8,693,123 B1 | | 4/2014 | Guo et al. | |
| 8,699,159 B1 | | 4/2014 | Malina | |
| 8,699,162 B1 | | 4/2014 | Grobis et al. | |
| 8,711,517 B2 | | 4/2014 | Erden et al. | |
| 8,810,946 B2 * | | 8/2014 | Yasui | G11B 5/1278 360/59 |
| 8,848,317 B2 * | | 9/2014 | Shiimoto | G11B 5/105 360/119.01 |
| 8,854,752 B2 | | 10/2014 | Jin et al. | |
| 8,867,161 B2 | | 10/2014 | Emo et al. | |
| 8,873,178 B2 | | 10/2014 | Erden et al. | |
| 8,913,335 B2 | | 12/2014 | Coker et al. | |
| 8,917,469 B1 | | 12/2014 | Guo et al. | |
| 8,929,186 B1 | | 1/2015 | Sharma et al. | |
| 8,976,478 B1 | | 3/2015 | Harllee, III et al. | |
| 9,053,712 B1 | | 6/2015 | Guo et al. | |
| 9,058,829 B1 | | 6/2015 | Wolf et al. | |
| 9,082,458 B1 | | 7/2015 | Tang | |
| 9,087,541 B1 | | 7/2015 | Pokharel et al. | |
| 9,099,103 B1 | | 8/2015 | Krichevsky | |
| 9,105,302 B1 | | 8/2015 | Erden et al. | |
| 9,111,575 B1 | | 8/2015 | Zhou et al. | |
| 9,111,578 B1 | | 8/2015 | Hassel et al. | |
| 9,129,658 B1 | | 9/2015 | Yamamoto | |
| 9,142,232 B2 | | 9/2015 | Edelman et al. | |
| 9,142,246 B1 | | 9/2015 | Trantham et al. | |
| 9,153,287 B1 | | 10/2015 | Hamilton et al. | |
| 9,324,362 B1 | | 4/2016 | Gao et al. | |
| 9,396,062 B1 | | 7/2016 | Sridhara et al. | |
| 9,418,688 B1 | | 8/2016 | Rausch et al. | |
| 2002/0035666 A1 | | 3/2002 | Beardsley et al. | |
| 2002/0035704 A1 | | 3/2002 | Wilson | |
| 2002/0105867 A1 | | 8/2002 | Tamaru et al. | |
| 2003/0214886 A1 | | 11/2003 | Sakamoto et al. | |
| 2005/0078399 A1 | | 4/2005 | Fung et al. | |
| 2005/0157597 A1 | | 7/2005 | Sendur et al. | |
| 2006/0215511 A1 | | 9/2006 | Shin et al. | |
| 2007/0047415 A1 | | 3/2007 | Chang | |
| 2007/0050593 A1 | | 3/2007 | Chen et al. | |
| 2007/0174582 A1 | | 7/2007 | Feldman | |
| 2008/0002272 A1 | | 1/2008 | Riedel | |
| 2008/0239901 A1 | | 10/2008 | Tsunokawa et al. | |
| 2008/0278861 A1 * | | 11/2008 | Jiang | G11B 5/112 360/319 |
| 2008/0316639 A1 | | 12/2008 | Tang et al. | |
| 2009/0244775 A1 | | 10/2009 | Ehrlich | |
| 2009/0251821 A1 | | 10/2009 | Song et al. | |
| 2010/0014183 A1 | | 1/2010 | Aoki et al. | |
| 2010/0027406 A1 | | 2/2010 | Krause et al. | |
| 2010/0271727 A1 | | 10/2010 | Namkoong et al. | |
| 2010/0321817 A1 | | 12/2010 | Aida et al. | |
| 2012/0014013 A1 | | 1/2012 | Bandic et al. | |
| 2012/0194946 A1 | | 8/2012 | Watanabe et al. | |
| 2013/0148225 A1 | | 6/2013 | Coker et al. | |
| 2013/0155826 A1 | | 6/2013 | Zhang et al. | |
| 2013/0182352 A1 * | | 7/2013 | Matsumoto | G11B 5/1278 360/234.3 |
| 2013/0294207 A1 | | 11/2013 | Erden et al. | |
| 2014/0016224 A1 | | 1/2014 | Unoki et al. | |
| 2014/0043708 A1 | | 2/2014 | Erden et al. | |
| 2014/0055881 A1 | | 2/2014 | Zaharris | |
| 2014/0153134 A1 * | | 6/2014 | Han | G11B 5/012 360/234.3 |
| 2014/0160589 A1 | | 6/2014 | Deki et al. | |
| 2014/0285923 A1 | | 9/2014 | Aoki et al. | |
| 2014/0327983 A1 | | 11/2014 | Biskeborn et al. | |
| 2015/0178161 A1 | | 6/2015 | Burd et al. | |
| 2016/0148629 A1 * | | 5/2016 | Gao | G11B 5/4984 360/64 |
| 2016/0148630 A1 | | 5/2016 | Rausch | |
| 2016/0148635 A1 | | 5/2016 | Zhu et al. | |
| 2016/0148636 A1 | | 5/2016 | Ma et al. | |
| 2016/0148637 A1 | | 5/2016 | Rausch et al. | |
| 2016/0148642 A1 | | 5/2016 | Gao | |
| 2016/0148643 A1 | | 5/2016 | Gao et al. | |
| 2016/0148644 A1 | | 5/2016 | Zhu et al. | |
| 2016/0148645 A1 | | 5/2016 | Zhu et al. | |
| 2016/0284366 A1 * | | 9/2016 | Yamaguchi | G11B 5/3116 |

FOREIGN PATENT DOCUMENTS

| | | |
|---|---|---|
| JP | H02-240862 A2 | 9/1990 |
| WO | 2005-030869 A1 | 4/2005 |

* cited by examiner

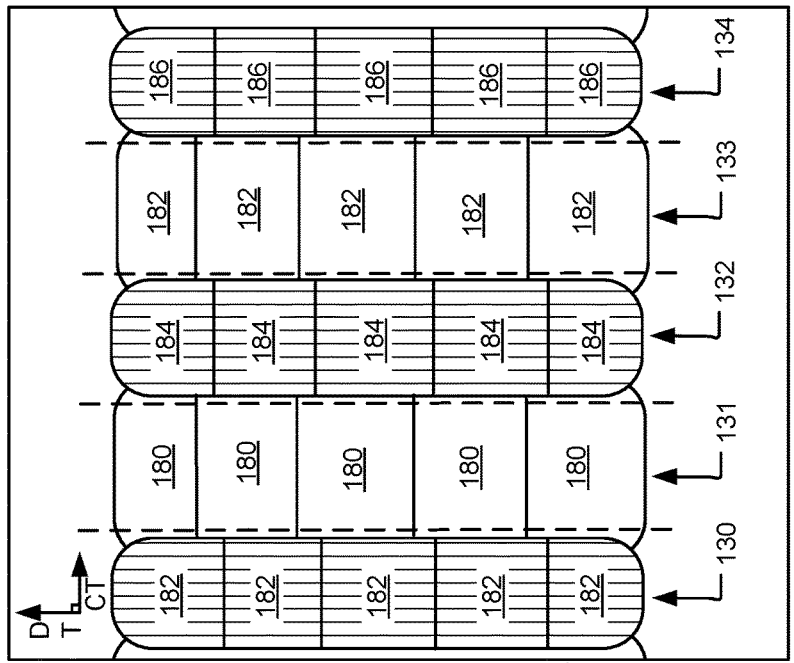
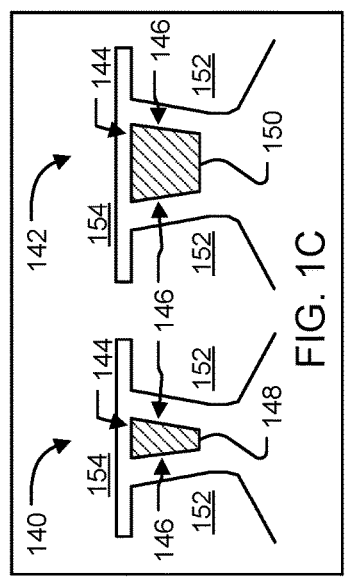
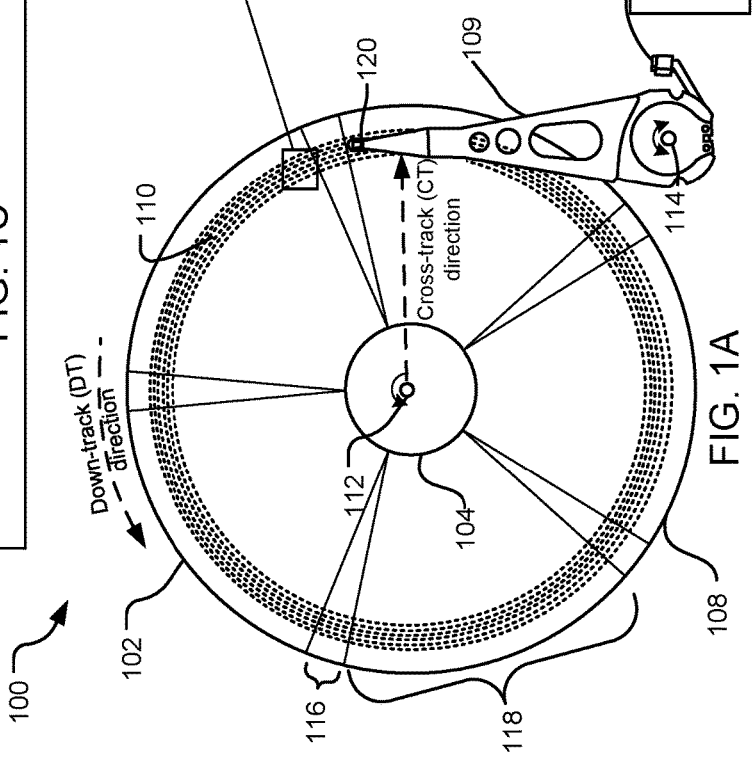
FIG. 1A
FIG. 1B
FIG. 1C

DUAL WRITER DESIGN IN INTERLACED MAGNETIC RECORDING

BACKGROUND

Interlaced magnetic recording (IMR) refers to utilizing two or more selected written track widths and two or more different linear densities for data writes to alternating data tracks on a storage medium. In IMR systems, data tracks may be read from or written to the data tracks in a non-consecutive order. For example, data may be written exclusively to a first track series including every other data track in a region of a storage medium before data is written to any data tracks interlaced between the tracks of the first series.

SUMMARY

The disclosed technology includes a storage device including an interlaced magnetic recording (IMR) system, and a transducer head including two writers, each writer including a write pole, wherein a width of a first write pole in a cross-track direction is substantially greater than a width of a second write pole in a cross-track direction, and wherein down-track width of a front shield gap of the first write pole is substantially similar to down-track width of a front shield gap of the second write pole. In another implementation, the storage device includes an IMR system, and a transducer head, including two writers, each writer including a write pole, wherein a width of the first write pole in a cross-track direction is substantially greater than a width of a second write pole in a cross-track direction, and wherein a cross-track width of a side shield gap of the first write pole is substantially similar to a cross-track width of a side shield gap of the second write pole.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIGS. 1A-C illustrate a plan view of an example disc drive assembly, example tracks in a dual writer interlaced magnetic recording (IMR) system, and example writers in the dual writer IMR system.

DETAILED DESCRIPTION

Figure 2:
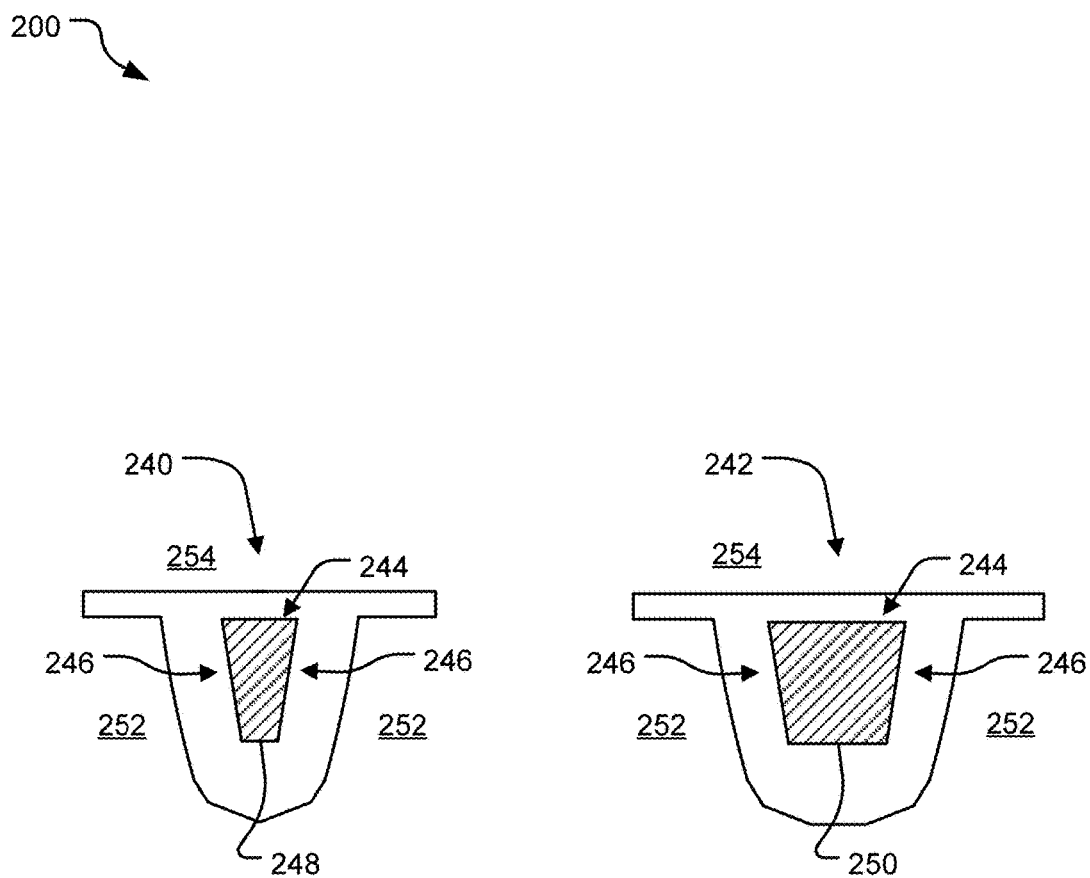
FIG. 2 illustrates example writers in a dual writer IMR system.

As requirements for area storage density increase for magnetic media, cell size decreases. A commensurate decrease in the size of a write element is difficult because in many systems, a strong write field is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

IMR systems may utilize two or more selected written track widths and two or more different linear densities for data writes to alternating data tracks on a storage medium. In IMR systems, data may be read from or written to the data tracks in a non-consecutive order. For example, data may be written exclusively to a first track series including every other data track in a region of a storage medium before data is written to any data tracks interlaced between the tracks of the first series.

In IMR systems, a data track of wide written track width is written prior to directly adjacent data tracks of narrower written track width. The data tracks of the wider written track width are also referred to herein as "bottom tracks," while the alternating data tracks of narrower written width are referred to herein as "top tracks."

In some implementations, the bottom tracks of wider written track width include data stored at a different linear density than one or more top tracks of narrow written track width. In still other implementations (e.g., on a bit-patterned media), the bottom and top data tracks are of equal written track width.

In the dual writer system, a wide writer records the bottom tracks which approximately doubles the desired track pitch (TP), and a narrow writer records the top tracks with the desired TP and also trims the bottom wide tracks to achieve the target TP. The disclosed technology includes a dual writer design for improving areal density capacity (ADC) by optimizing wide writer and narrow writer designs.

The ADC gain can be attributed to two aspects: 1) the on-track BPI (bits per inch) improvement from better transition curvature and larger field gradient generated by the wide writer; and 2) the on-track BPI benefit of the narrow track with its un-squeezed track width. Since there is no Adjacent Track Interference (ATI) concern for the bottom track writing in IMR, theoretically the bottom writer pole can be as wide as possible to maximize its linear density gain. However, the on-track improvement from increasing pole width is not monotonic. The field gradient can be degraded from front shield saturation when the write pole is too wide (or the write field is too strong). In addition, the wide pole width makes the pole saturation slower because of a larger surface demagnetization field, consequently requiring higher driving current that is limited by the preamplifier.

The disclosed technology addresses how to optimize wide writer and narrow writer designs simultaneously and to maximize the total on-track gain to the dual writer system. In some implementations, discussed below, different design combinations of wide writer and narrow writer are provided, including varying write pole widths of the wide writer and the narrow writer, and varying designs of front shield gaps, side shield gaps, and break points for the best on-track performance.

FIGS. 1A, 1B, and 1C illustrate plan views of an example disc drive assembly (FIG. 1A), example tracks in a dual writer IMR system (FIG. 1B), and example writers in the dual writer IMR system (FIG. 1C). FIG. 1A shows disc drive assembly 100 including a transducer head assembly 120 with a writer and reader (not shown) for writing and reading data to and from a magnetic storage medium 108. The transducer head assembly 120 may include a number of reader and writer configurations such as heat assisted magnetic recording (HAMR), multiple read and/or write heads, etc. Although other implementations are contemplated, the magnetic storage medium 108 in FIG. 1A is a magnetic storage disc on which data bits can be recorded using a magnetic write pole and from which data bits can be read using a magnetoresistive element (not shown). As illustrated in FIG. 1A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The magnetic storage medium 108 includes a number of servo sectors (e.g., a servo sector 116) extending radially between the inter diameter 104 and the outer diameter 102. In one implementation, each of the servo sectors (e.g., servo sector 116) includes embedded information used for track seeking and track following. In particular, the information includes fine head position information used for centerline tracking. Between every two consecutive servo sectors (e.g., servo sector 116) is a wedge (e.g., a wedge 116) that includes multiple sectors (e.g., data sectors and super parity sectors, not shown) of concentric data tracks 110.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 112. The seek operation positions the transducer head assembly 120 over a target data track for read and write operations.

The disc drive assembly 100 further includes a storage controller 106. The storage controller 106 includes software and/or hardware, and may be implemented in any tangible processor-readable storage media within or communicatively coupled to the storage device 100. The term "tangible processor-readable storage media" includes, but is not limited to, RAM, ROM EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

FIG. 1B illustrates a magnified view of a section of the magnetic storage medium 108 (in FIG. 1A) including data tracks (e.g., data tracks 130, 131, and 132) storing data according to an IMR technique. The data tracks (e.g., data tracks 130, 131, and 132) are divided into data sectors (e.g., data sectors 182, 180, and 184) which include a plurality of polarized regions (not shown), also referred to as "data bits," each representing one or more individual data bits of the same state (e.g., 1s or 0s).

The illustrated IMR technique utilizes alternating data tracks of different written track widths arranged with slightly overlapping written track boundaries so that a center-to-center distance between directly adjacent tracks (e.g., the track pitch) is uniform across an area (e.g., a radial zone or across an entire surface of the magnetic storage medium 108). Specifically, FIG. 1B illustrates a first series of alternating tracks (e.g., the tracks 131 and 133) with a wider written track width than a second series of alternating data tracks (e.g., the tracks 130, 132, and 134). The first series of alternating tracks are bottom tracks, and the second series of alternating tracks are top tracks.

According to one implementation, each wide data track (i.e., bottom track) of the first series is written before the data is written to any directly-adjacent data tracks (i.e., top tracks) of the second series. For example, the data track 131 is written before data is written to either of the data tracks 130 and 132. Data writes to the data tracks 130 and 132 may subsequently overwrite outer edge portions of the data track 131, however, the data track 131 is still readable due to sufficient information retained in a center region of the data track 131.

Referring to FIG. 1C, an air-bearing surface (ABS) view of example dual writers of the transducer head assembly 120 (in FIG. 1A) for the magnetic storage medium 108 (in FIG. 1A) is shown. The dual writers both have a standard side shield design. Compared to the box side shield design, the standard side shield design generates a better on-track linear density from its better down-track field gradient and its smaller transition curvature because in the standard side shield design, more magnetic flux from a write pole will flow to a trailing shield. The magnetic field is more confined in a down-track direction than in the box side shield design. The dual writers are co-planar.

The dual writers comprise of a narrow writer 140 and a wide writer 142. The narrow writer 140 and the wide writer 142 both have the same sized front shield gap or trailing shield gap (FSG) 144 and the same sized side shield gap (SSG) 146. In other words, a down-track width of the FSG 144 of the narrow writer 140 is substantially same as a down-track width of the FSG 144 of the wide writer 142. Likewise, a cross-track width of the SSG 146 of the narrow writer 140 is substantially same as a cross-track width of the SSG 146 of the wide writer 142. The FSG 144 is the gap located between the writer pole 148 and the trailing shield 154 in the narrow writer 140 as well as the gap located between the writer pole 150 and the trailing shield 154 in the wide writer 142. The FSG 144 intercepts fringing flux generated by the writer poles 148 and 150. The SSG 146 is the gap located between the writer pole 148 and the side shields 152 in the narrow writer 140 as well as the gap located between the writer pole 150 and the side shields 152 in the wide writer 142. In one implementation, the SSG 146 is symmetric on both sides of the writer poles 148 and 150. The SSG 146 intercepts fringing flux generated by the writer poles 148 and 150 and prevent erasing or weakening of prior recorded information on adjacent tracks of the media. The FSG 144 and the SSG 146 can be filled with non-magnetic materials that have similar thermal protrusion to that of the front shield (not shown) and side shields 152 (e.g., to make a writer head to media spacing smaller), and do not cause severe corrosion during transducer slider lapping.

In some implementations, the dual writer design can have the same sized FSG and SSG in each of the narrow writer 140 and the wide writer 142, even as the wide writer 142 has a write pole width of about 1.5 to 2.0 times larger than that of the narrow writer 140 in a cross-track direction. An advantage of using the same sized FSG 144 and SSG 146 in a narrow writer 140 and a wide writer 142 is that it can greatly simplify the process complexity because the SSG 146, for example, is defined by depositing a non-magnetic layer around a write pole after the write pole shape is formed in an early process step.

In other implementations, the cross-track widths of the SSGs 146 may be different between the narrow writer 140 and the wide writer 142. In these implementations, a non-magnetic layer of a different thickness can be deposited to the co-planer dual writers in the same wafer, increasing process efforts. Such a scenario may also be applicable to the FSG 144 of the dual writers. If the narrow writer 140 and the wide writer 142 have a different FSG 144, then the process may include covering one part of the wafer and depositing a non-magnetic layer of a first thickness. After using a process to protect the first thickness, another part of the wafer may be covered before depositing another non-magnetic layer of a second thickness, wherein the second thickness is different than the first thickness.

FIG. 2 illustrates different example writers 200 in a dual writer IMR system. Specifically, FIG. 2 shows an ABS view of example dual writers 200 having the same sized FSG and SSG. The dual writers 200 both have a box side shield design. Compared to the standard side shield design, in the box side shield design the two side shields are connected beneath the write pole. This constrains the fringing field from the write pole to an adjacent track, benefiting ATI. A more confined field in a cross-track direction improves the track density (TPI, track pitch per inch) as well. In addition, the box side shield may re-distribute the write pole flux flowing into a trailing shield (front shield) and side shields reducing the risk of front shield saturation and on-track erasure. The dual writers 200 are co-planar. The dual writers 200 comprise of a narrow writer 240 and a wide writer 242. In one implementation, the narrow writer 240 and the wide writer 242 both have the same sized FSG 244 and the same sized SSG 246.

The FSG 244 is the gap located between the writer pole 248 and the trailing shield 254 in the narrow writer 240 as well as the gap located between the writer pole 250 and the trailing shield 254 in the wide writer 242. The SSG 246 is the gap located between the writer pole 248 and the side shields 252 in the narrow writer 240 as well as the gap located between the writer pole 250 and the side shields 252 in the wide writer 242. The SSG 246 is symmetric on both sides of the writer poles 248 and 250. As described in FIG. 1, the advantage of using the same FSG and the same SSG in a wide writer and a narrow writer is that it can greatly simplify the process complexity.

Figures 3A, 3B:
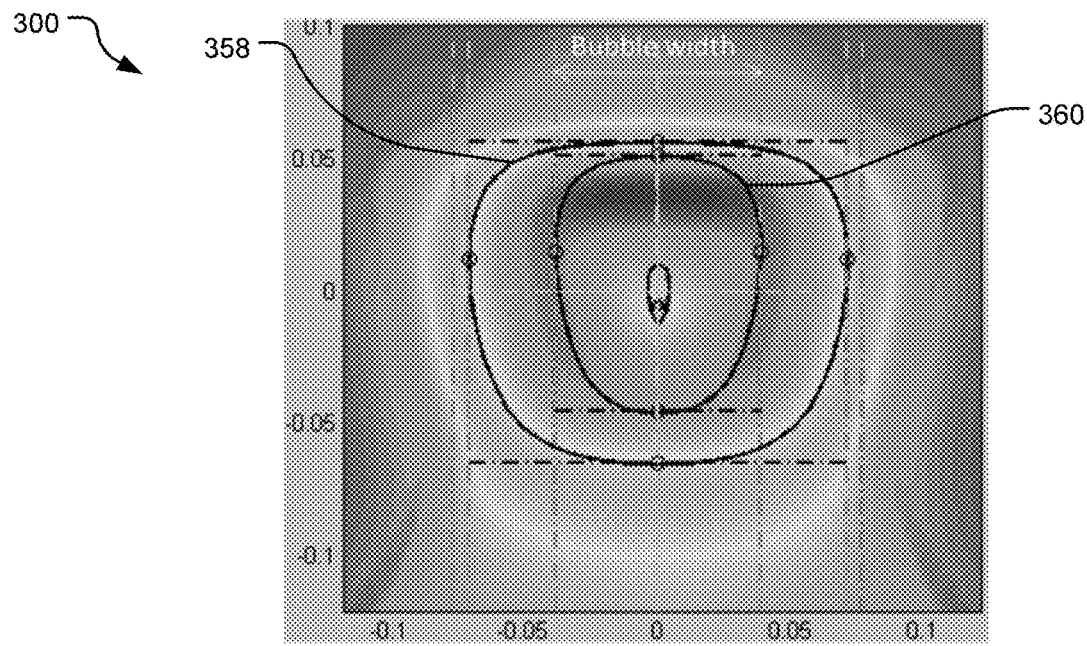
FIGS. 3A and 3B show graphs of the write bubbles and down-track field gradient along the bubble trailing edge of narrow and wide writers with the same front shield gap and side shield gap.

FIGS. 3A and 3B show graphs 300 of the write bubbles and down-track field gradient along the bubble trailing edge of narrow and wide writers with the same FSG and SSG. The write bubbles are the interaction results of a write field with magnetic grain's switching field in the media. When the effective field of a writer is equal or larger than a magnetic grain's switching field, the grain gets switched. The write bubbles in FIG. 3A are defined by a writer's effective field contours that are equal to media dynamic coercivity, corresponding to the collective of grains' switching fields. When a writer's driving current changes polarity, a magnetic transition (i.e., the region from one recording bit to another in a down-track direction) will be generated in a media along the trailing edge of the bubble. Transition quality, such as sharpness in a down-track direction and curvature in a cross-track direction, directly relates to the linear density and other on-track performance of the recording system. Therefore, the down-track field gradient at a bubble trailing edge relates to the transition sharpness. The trailing edge curvatures are very important design factors.

In FIG. 3A, the wide writer generates a wider write bubble 358 and the narrow writer generates a narrower write bubble 360. Within the target track pitch, the transition curvature of the wide write bubble 358 is much less than that of the narrow write bubble 360.

Referring to FIG. 3B, within the target track pitch, the wide writer can generate a larger down-track gradient and a much better gradient roll-off along the cross-track direction (shown in the solid line) in comparison to that of the narrow writer (shown in the dotted line). Specifically, as shown in FIG. 3B the wide writer generates a roll-off along the cross-track direction between −0.03 to +0.03 (along x-axis), compared to which the roll-off of the narrow writer is much narrower and concentrated around 0 (along x-axis). These characteristics help improve transition sharpness and BPI.

The gradient improvement achieved through an increase in write pole width can become constrained by front shield (or trailing shield) saturation. At a fixed FSG, the strong write field from the wide pole can saturate the front shield, causing on-track erasure and possible error rate degradation. The front shield saturation is also a function of the FSG. Enlarging the FSG can mitigate front shield saturation. Thus, in consideration of the gradient improvement and front shield saturation risk in implementations where a wide writer design and a narrow writer design have the same sized FSG and SSG, the wide writer pole width can vary with a constrained up range, or wide writer and narrow writer both enlarge FSG together.

In implementations where the FSG and SSG are different for the wide writer and the narrow writer in a dual writer design, the IMR writer design space will broaden, providing more opportunity to generate a better ADC gain. In these implementations, the wide writer has a larger FSG and a larger SSG than that of the narrow writer because the narrow writer SSG defines the final target track pitch, and the SSG is limited to move to a large dimension. The FSG (e.g., measuring approximately 21 nm) is selected to have the best down-track gradient under the limited sized SSG. The wide writer can take the advantage of using a larger SSG or no side shield to harvest more on-track gradient without concern for the worse ATI caused by the larger SSG. Meanwhile, using a larger FSG (e.g., measuring approximately 23 to 25 nm) will reduce front shield saturation risk caused by the strong write field due to a wide pole width and a larger SSG.

Figure 4A:
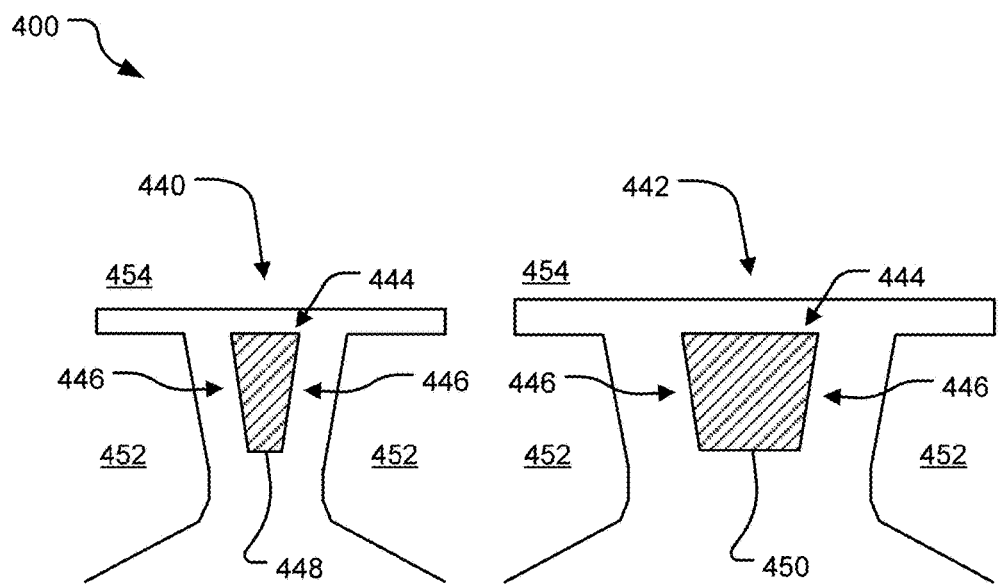
FIGS. 4A and 4B illustrate example writers in a dual writer IMR system.
Figure 4B:
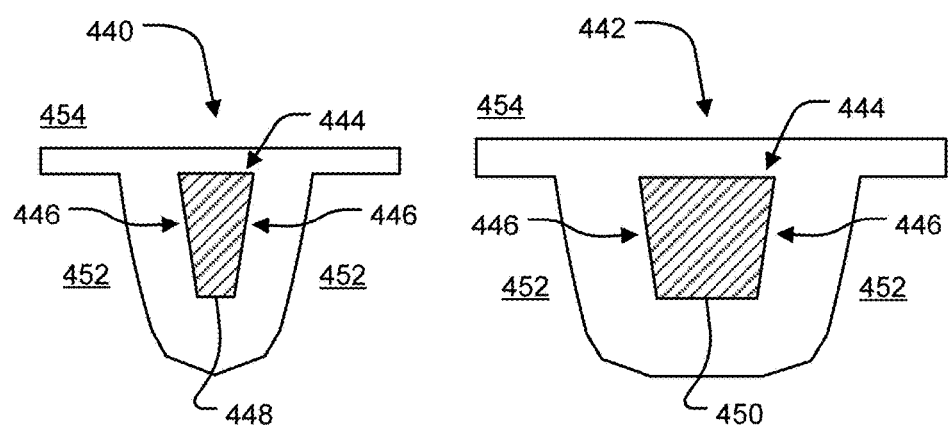

FIGS. 4A and 4B illustrate example writers 400 in a dual writer IMR system. An ABS view of example dual writers 400 having different sized FSG and SSG in a standard side shield design and in a box side shield design, is shown in FIGS. 4A and 4B, respectively. The dual writers 400 in FIGS. 4A and 4B are co-planar. The dual writers 400 comprise of a narrow writer 440 and a wide writer 442. The narrow writer 440 and the wide writer 442 in both FIGS. 4A and 4B have different sized FSG 444 and different sized SSG 446. In other words, the down-track width of the FSG 444 of the narrow writer 440 is substantially different than the down-track width of the FSG 444 of the wide writer 442. Likewise, the cross-track width of the SSG 446 of the narrow writer 440 is substantially different than the cross-track width of the SSG 446 of the wide writer 442.

The FSG 444 is the gap located between the writer pole 448 and the trailing shield 454 in the narrow writer 440, and the gap located between the writer pole 450 and the trailing shield 454 in the wide writer 442. The SSG 446 is the gap located between the writer pole 448 and the side shields 452 in the narrow writer 440, and the gap located between the writer pole 450 and the side shields 452 in the wide writer 442. The SSG 446 is symmetric on both sides of the writer poles 448 and 450. In such implementations where dual writers 400 have a different FSG 444 and SSG 446, the wide writer 442 will have a larger FSG 444 and a larger SSG 446 than that of the narrow writer 440.

In one implementation, combining the gradient benefit and FS saturation risk of the dual writers with the same sized FSG and SSG, a wide writer can have 1.5 to 1.8 times larger pole width than the narrow writer pole width with an FSG measuring approximately 21 nm and an SSG measuring approximately 58 nm. In another implementation of the dual writers with the same sized FSG and SSG, the wide writer can have 1.75 to 2.0 times larger pole width than the narrow writer with an FSG measuring approximately 23 nm and an SSG measuring approximately 58 nm. In yet another implementation of the dual writers with a different sized FSG and a different sized SSG, and the narrow writer having an FSG measuring approximately 21 nm and an SSG measuring approximately 58 nm, the wide writer pole width may be 1.7 to 1.9 times wider when it has an FSG measuring approximately 23 nm and an SSG measuring approximately 58 nm (or an FSG measuring approximately 25 nm and an SSG measuring approximately 68 nm), and the wide writer pole width may be 1.5 to 1.7 times wider when an FSG is measuring approximately 23 nm and an SSG is measuring approximately 68 nm. The wide writer and the narrow writer can have the same break point.

Figure 5A:
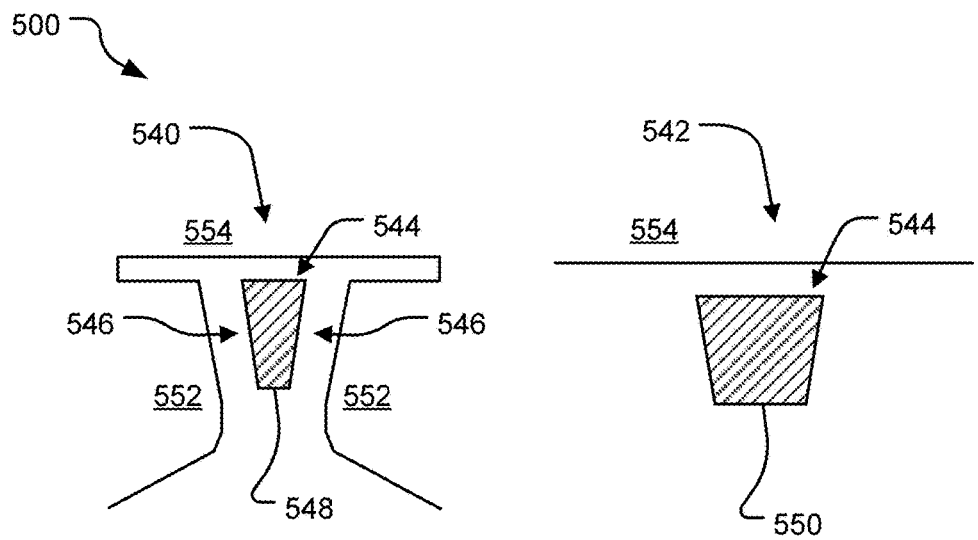
FIGS. 5A and 5B illustrate example writers in a dual writer IMR system.
Figure 5B:
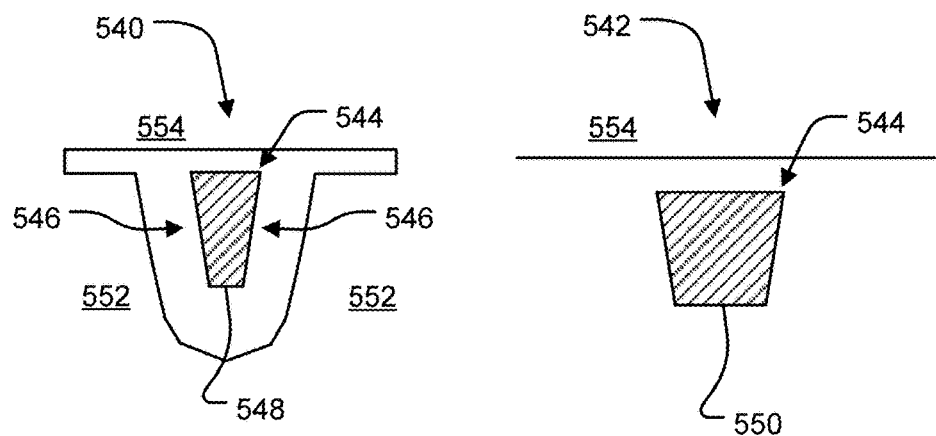

FIGS. 5A and 5B illustrate example writers 500 in a dual writer IMR system. Referring to FIGS. 5A and 5B, an ABS view of example dual writers 500 having wide writers 542 with no side shields combined with normal narrow writers 540 with side shields 552, and SSG 546, are shown. The dual writers in FIGS. 5A and 5B are co-planar. In this implementation, to mitigate FS saturation, the FSG 544 of the wide writer 542 is larger than the FSG 544 of the narrow writer 540.

The FSG 544 is the gap located between the writer pole 548 and the trailing shield 554 in the narrow writer 540, and the gap located between the writer pole 550 and the trailing shield 554 in the wide writer 542. The SSG 546 is the gap located between the writer pole 548 and the side shields 552 in the narrow writer 540. The SSG 546 is symmetric on both sides of the writer pole 548.

Figure 6A:
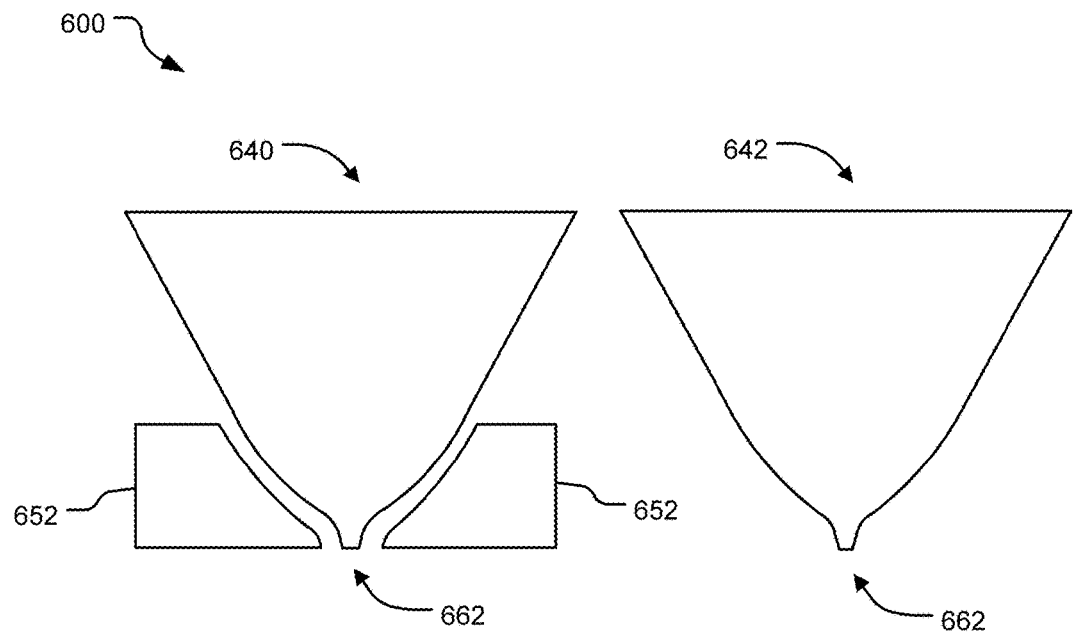
FIGS. 6A and 6B illustrate example writers in a dual writer IMR system.
Figure 6B:
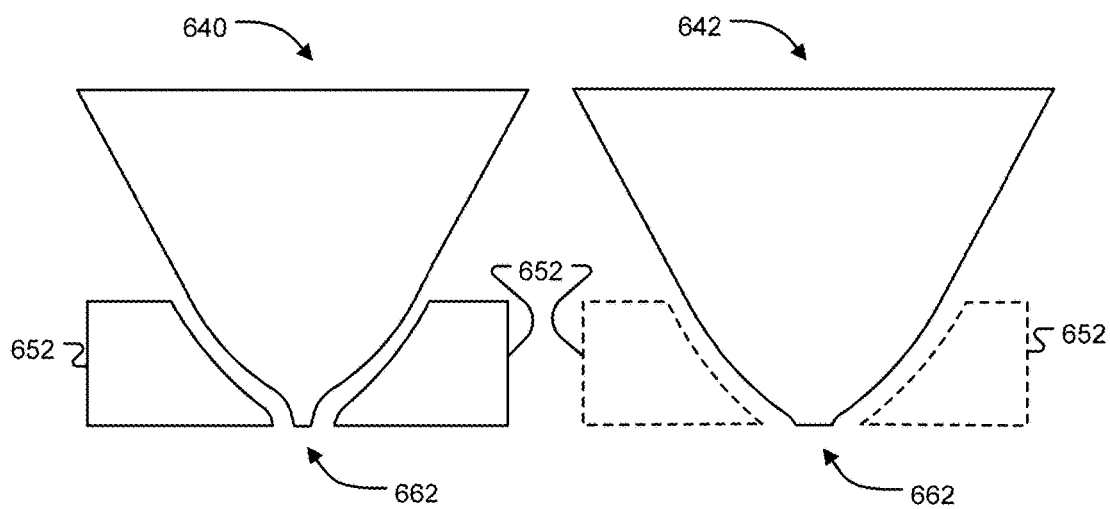

FIGS. 6A and 6B illustrate example writers 600 in a dual writer IMR system. In FIGS. 6A and 6B, the top-down view of paddle-shaped surfaces of example dual writers is shown. In some implementations such as in FIG. 6A, the writer 640 is the narrow writer with side shields 652, and the writer 642 is the wide writer without side shields. The two paddle shapes are identical, and the two break point lengths are also the same. In other implementations, such as in FIG. 6B, the writer paddle shape of the wide writer 642 can be a different shape than the shape of the narrow writer 640. Whether or not there are side shields, the writer paddle shape of the wide writer 642 can have a zero break point 662, or a shorter break point 662 than that of the narrow writer 662. In other words, the into-ABS length (orthogonal or perpendicular to the ABS direction) of a break point 662 of the wide writer 642 is lesser than the into-ABS length of a break point 662 of the narrow writer 640. In some more implementations not depicted here, a wide writer can also have a longer break point than a narrow writer break point for front shield saturation reduction and write pole dynamic switching.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
   an interlaced magnetic recording system; and
   a transducer head, including two writers, each writer including a write pole, wherein a width of a first write pole in a cross-track direction is substantially greater than a width of a second write pole in the cross-track direction, and wherein a down-track width of a front shield gap of the first write pole is substantially similar to a down-track width of a front shield gap of the second write pole.

2. The storage device of claim 1, wherein cross-track widths of side shield gaps of the first write pole are substantially similar to cross-track widths of side shield gaps of the second write pole.

3. The storage device of claim 1, wherein the two writers have a box side shield design.

4. The storage device of claim 1, wherein the first write pole and the second write pole are co-planar.

5. The storage device of claim 1, wherein the width of the first write pole in a cross-track direction is 1.5-2.0 times the width of the second write pole in a cross-track direction.

6. A storage device comprising:
   an interlaced magnetic recording system; and
   a transducer head, including two writers, each writer including a write pole, wherein a width of a first write pole in a cross-track direction is substantially greater than a width of a second write pole in a cross-track direction, and wherein a cross-track width of a side shield gap of the first write pole is substantially similar to a cross-track width of a side shield gap of the second write pole.

7. The storage device of claim 6, wherein a down-track length of a break point of a paddle-shaped surface of the writer with the wider first write pole is substantially lesser than a down-track length of a break point of a paddle-shaped surface of the writer with the narrower second write pole.

8. The storage device of claim 6, wherein the paddle-shaped surface of the writer with the wider first write pole has no break point.

9. The storage device of claim 6, wherein the width of the first write pole in the cross-track direction is approximately 1.5-2.0 times the width of the second write pole in the cross-track direction.

10. The storage device of claim 6, wherein the two write poles are co-planar.

11. The storage device of claim 6, wherein the writer with the wider first write pole has no side shields.

12. A transducer head comprising:
    a first writer including a first write pole; and
    a second writer including a second write pole, wherein a width of the first write pole in a cross-track direction is greater than a width of the second write pole in the cross-track direction, wherein the first write pole and the second write pole are co-planar, and wherein a down-track width of a front shield gap of the first write pole and a down-track width of a front shield gap of the second write pole are substantially similar.

13. The transducer head of claim 12, wherein the first write pole has no side shields.

14. The transducer head of claim 12, wherein and a cross-track width of a side shield gap of the first write pole and a cross-track width of a side shield gap of the second write pole are substantially similar.

15. The transducer head of claim 12, wherein a down-track width of a front shield gap of the first write pole and a down-track width of a front shield gap of the second write pole are substantially different and a cross-track width of a side shield gap of the first write pole and a cross-track width of a side shield gap of the second write pole are substantially different.

16. The transducer head of claim 12, wherein surfaces of the first write pole and the second write pole are paddle-shaped and have side shield gaps of a different size.

17. The transducer head of claim 12, wherein the second writer has side shields and a break point, and the first writer does not have side shields and has a break point.

18. The transducer head of claim 12, wherein the second writer has side shields and a break point, and the first writer does not have side shields and does not have a break point.

19. The transducer head of claim 12, wherein the second writer has side shields and a break point, and the first writer has side shields and does not have a break point.

* * * * *